United States Patent [19]
Sueyoshi et al.

[11] 3,789,103
[45] Jan. 29, 1974

[54] PROCESS FOR INJECTION MOLDING POLYESTER PREMIXES

[75] Inventors: Toshihiko Sueyoshi; Mitsuo Kozawa, both of Aki District, Japan

[73] Assignee: Japan Steel Works Ltd., Tokyo, Japan

[22] Filed: Aug. 12, 1971

[21] Appl. No.: 171,240

[30] Foreign Application Priority Data
Sept. 4, 1970   Japan................................ 45-77028

[52] U.S. Cl................................. 264/329, 425/251
[51] Int. Cl.............................................. B29f 1/08
[58] Field of Search..... 264/329; 425/293, 245, 251

[56] References Cited
UNITED STATES PATENTS

| | | | |
|---|---|---|---|
| 3,355,764 | 12/1967 | Moyer.................. | 425/251 |
| 3,500,501 | 3/1970 | Johansson............. | 425/245 |
| 2,790,203 | 4/1957 | Dykehouse............ | 264/329 X |
| 3,508,298 | 4/1970 | Seidl................... | 425/243 X |
| 2,439,966 | 4/1948 | Dinzl.................... | 425/243 X |
| 3,516,957 | 6/1970 | Gray..................... | 264/329 X |
| 3,140,332 | 7/1964 | Brown................... | 264/329 |

Primary Examiner—Robert F. White
Assistant Examiner—Richard R. Kucia
Attorney, Agent, or Firm—E. F. Wenderoth et al.

[57] ABSTRACT

Putty-like raw material composed of fluid polyester with added fillers, pigments, reinforcements, etc. is forced into a screw containing heating cylinder through a push chamber which communicates with said heating cylinder by a converging flow passage so that the temperature of said material is raised by the shearing action and the external heating to which it is subject during its passing through said passage, the raw material thus supplied into said heating cylinder is advanced forwardly by the rotating screw so that its temperature is regulated from externally of said heating cylinder, and, after it is heated again at the front end portion of the heating cylinder, it is injected into dies and reflux thereof is prevented.

1 Claim, 2 Drawing Figures

TOSHIHIKO SUEYOSHI
MITSUO KOZAWA,
INVENTOR

BY Sughrue, Rothwell, Mion, Zinn & Macpeak

ATTORNEY

PROCESS FOR INJECTION MOLDING POLYESTER PREMIXES

BACKGROUND OF THE INVENTION

This invention relates to a process for molding synthetic resins, and more particularly to a process for molding by a single-screw extruder a putty-like material composed of fluid polyester with added fillers, lubricants, pigments, polimerization catalysts, reinforcement, etc., that is, so-called polyester-premixes.

Hitherto the molding of thermosetting synthetic resins of the kind referred above has been done by such processes as pressure forming, transfer molding, plunger type injection molding owing to their properties, and has not yet been done by a screw type injection molding process, the reasons for which are as follows:

1. since the polyester-premix is composed of putty-like lumps rather than powders or pellets, it is impossible for it to be continuously and stably bitten by the screw;

2. Since the reinforcements (e.g. glass fibers) are broken to pieces due to the shearing action of the screw, the reinforcing effect thereof on the resins decreases to give to the resin only small mechanical strength so that such a material can not be put to practical use; and 3. Since the polyester-premix has low viscocity and is often referred to as a contacting pressure resin, the reflux of the raw material from the head portion of the heating cyclinder at the time of its injection is so violent that the control of the volume of injected material is difficult, resulting in the problem that the molding cannot be continued under constant conditions.

Notwithstanding the fact that, by the use of injection molding of polyester-premix by a screw, there can be obtained a reduction of the molding time due to the temperature rise of the material, increased lustre of the surface of the molded article due to the adoption of a high injection pressure, the excellent and precise dimension of the molded articles, the increase in the yield from the raw material due to the decrease in the flash produced, reduced labour cost due to the automation of the process, etc., and marked advantages can be obtained as compared with other hitherto known molding processes, the largest reason why such a process has never been used in actual manufacturing is that, although it may be theroetically ideal, actually the polyester-premix cannot be supplied to the screw under a constant condition, which in turn causes an unstable biting by the screw so that the feeding is unstable, resulting in unnecessary shearing of the polyester-premix, and further that, during molding has actually not been possible by any means because of the local heating and refluxing of the raw material which are produced at this portion of the apparatus. expected strength can not be obtained due to the cutting and grinding of the reinforcements.

In addition, it should be mentioned further, that due to the lack of check valves suitable for the resins of this kind which can be used for preventing the raw materials from refluxing when they are injected, this type of injection molding has actually not been possible by any means because of the local heating and refluxing of the raw materials which are produced at this portion of the apparatus.

SUMMARY OF THE INVENTION

It is an object of the present invention to provide a process for injection molding polyester premixes in which the premixes are fed to a screw of an extruder continuously and reinforcements contained in the polyester premixes are not subject to cutting or grinding during the kneading of the polyester premixes.

Another object of the present invention is to provide a process for injection molding polyester premixes in which the polyester premixes are supplied to the screw with control of their viscosity.

Still another object of the present invention is to provide a process for injection molding polyester premixes by which a molded article having a glossy surface and a higher mechanical strength can be produced within a shorter time than required for the conventional processes.

A further object of the present invention is to provide a screw type injection molding apparatus which is suitable fo carrying out the process according to the present invention as described above.

A still further object of the present invention is to provide a screw type injection molding apparatus which is suitable for carrying out the process according to the present invention as described above which is provided with check valve means in the path of the flow of the polyester premixes that can perfectly prevent the polyester premixes from flowing backward.

In accordance with this invention an injection process is provided for molding polyester premixes which comprises supplying a putty-like raw material composed of fluid polyester with fillers, lubricants, pigments, polymerization catalysts, reinforcements, etc. added to a raw material charging chamber of a raw material push feeding device, feeding said putty-like raw material into a heating cylinder including a screw under a constant pressure and a constant flow rate by the action of a hydraulically operated piston, kneading and feeding said putty-like premixes by said screw in said heating cylinder, which is maintained at a constant temperature below a predetermined temperature, whereby said putty-like premixes are not subjected to substantial shearing, accumulating at the forward end of said heating cylinder said putty-like premixes in which the reinforcements have not been cut and which have been uniformly heated to a temperature below a temperature to cause curing of the premixes, injecting said putty-like premixes into a cavity formed between closed metal dies by the advance of said screw, whereby the reflux of said premixes is prevented by check valve means provided between the inner surface of said heating cylinder and the outside of said screw and said putty-like premixes have the temperatures thereof raised further by the fluid friction to which they are subjected during flow through the nozzle, runners and gates of said dies before reaching the cavity, and curing said raw material in said dies by maintaining the surface temperatures thereof at a curing temperature.

The screw type injection molding apparatus for carrying out the method of the present invention preferably comprises a raw material push chamber including a push piston, a guide heating cylinder disposed between and insulated from said raw material push chamber and a heating chamber including a screw, said guide heating cylinder having a flow passage heated by a heating jacket and converging towards said heating cylinder, a raw material supplying opening in the bore of said heating cylinder formed by cutting out the wall of said heating cylinder at the intersection with said guide heating cylinder in the rotational direction of said screw, at least two sets of jackets arranged around said heating cylinder to circulate heating mediums, check valve means provided at the forward end portion of said heating cylinder composing of a screw head having at least two screw threads connected to the forward end of said screw and a valve seat provided in the bore of said heating cylinder as well as a valve body provided at the outside surface of said screw head, and driving means to rotate and reciprocate said screw axially in said heating cylinder.

BRIEF DESCRIPTION OF THE DRAWINGS

These and other objects, features and advantages of the invention will be more readily understood from the following detailed description in conjunction with the accompanying drawings, in which.

DESCRIPTION OF THE PREFERRED EMBODIMENTS

Figure 1:
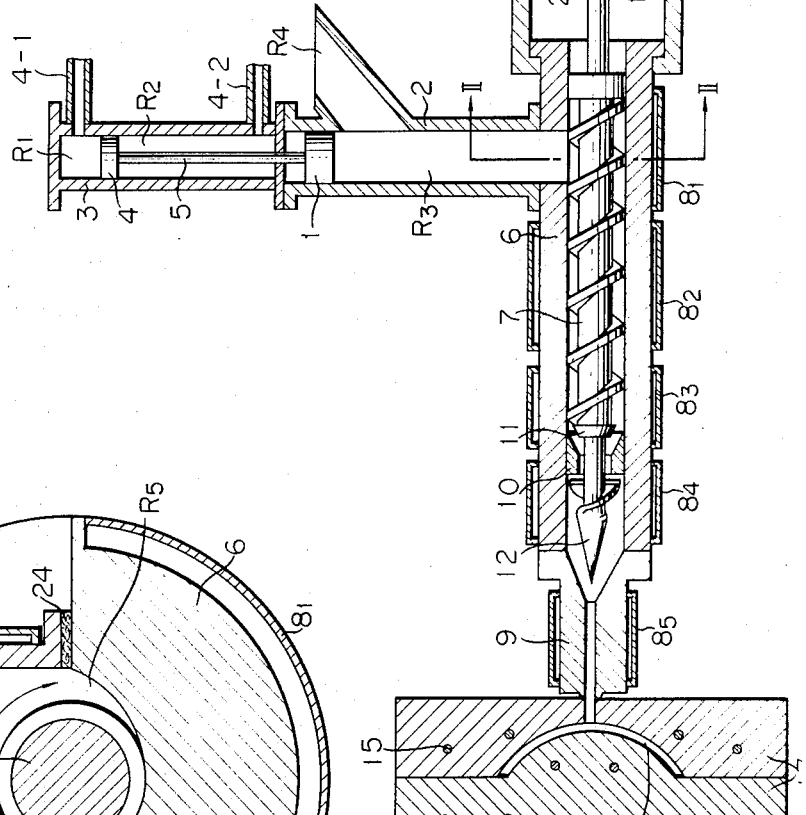
FIG. 1 is a longitudinal sectional view of an embodiment of an apparatus for carrying out the method according to the present invention.
Figure 2:
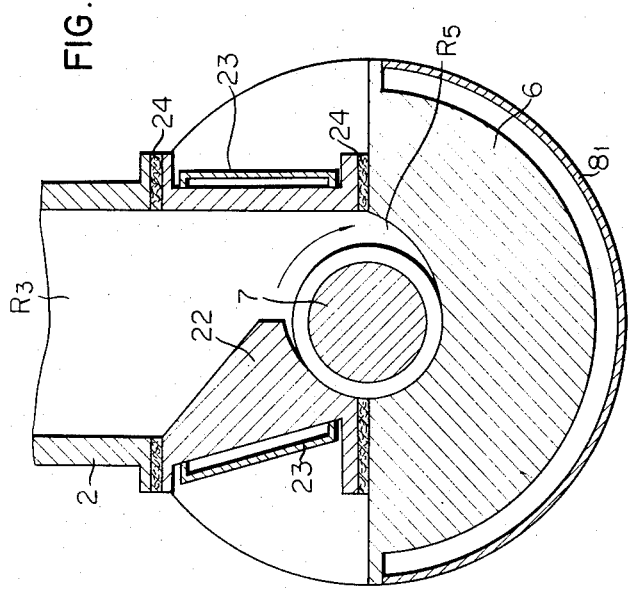
FIG. 2 is a transversal sectional view taken along the line II — II of FIG. 1.

Referring to FIG. 1, the reference numeral 1 is a push piston introduced into a vertical push cylinder 2 and push piston 1 is adapted to be reciprocated in a push chamber $R_3$ of push cylinder 2 through a push piston rod 5 connected to a fluid pressure piston 4 in a fluid pressure cylinder 3, which is provided with fluid chambers $R_1$ and $R_2$ to be supplied with pressurized fluid via conduit 4 - 1 or 4 - 2, respectively. A supplying orifice $R_4$ opens through the wall of cylinder 2 at its upper portion and is adapted to communicate with chamber $R_3$ when push piston 1 is raised to the uppermost end of the stroke thereof by supplying pressurized fluid into chamber $R_2$ of fluid pressure cylinder 3. Chamber $R_3$ is connected at its bottom to the bore of a heating cylinder 6 through a guide heating cylinder 22 as will be explained in more detail later (see FIG. 2). Provided around heating cylinder 6 are a number of heating jackets $8_1 - 8_4$ which are adapted have circulated therein heating mediums heated by any suitable heating means (not shown) arranged outside of the apparatus to regulate the temperature of heating cylinder 6. The number of jackets $8_1 - 8_4$ may be increased or decreased according to the heating requirements, but, at least two jackets are required, and, they are preferably independently provided with entrance and exit openings for supplying the heating mediums so that the temperatures of jackets $8_1 - 8_4$ can be separately regulated. Within the bore of heating cylinder 6 there is shiftably disposed a ring-like valve seat member 10 that is associated with a valve body 11 formed at the rear end of a screw head 12. The screw head 12 is secured to the forward end of screw 7 and has at least two starting screw threads on its outer periphery. Valve body 11, valve seat 10 and screw head 12 together form a check valve means to prevent the polyester premixes from counter flowing at the time of injection, but such a check valve means is only described as one example of one suitable for use in the present invention, and the reason why such check valve means is used in the embodiment shown is that (1) no reduction in the cross section of the flow passage is caused so that there is actually substantially little change in the flow direction; (2) the fluid material can flow freely essentially along straight lines through the orifice of valve seat 10; (3) the material feeding action is greater at the plurality of starting screw threads on the screw head 12 than at screw 7, guaranteeing uniform rapid flow of the material through valve seat 10 to prevent it from being overheated due to its staying at the vicinity of the valve orifice.

Secured to the front end of heating cylinder 6 is a nozzle 9 which is surrounded by a jacket $8_5$ and serves to extrude the premixed polyester into a cavity 14 formed of metal dies 13 and which is heated by electrical heating wires 15 embedded therein. Screw 7 is, at its rear end, slidably connected by a splined shaft 16 secured thereto to one end of an extrusion piston 17, to the other end of which is slidably connected a driving shaft 19 drivingly connected to a prime mover 18. Piston 17 is disposed in a extruding cylinder 21 to perform a reciprocal motion so that screw 7 can either reciprocate in the bore of heating cylinder 6 when piston 17 performs a reciporcating motion in extruding cylinder 21, or rotate in the bore when prime mover 18 is driven, or effect both reciprocation and rotation. Disposed between the outer periphery of piston 17 and the central bore in one of the end plates of cylinder 21 through which piston 17 passes is a sealing packing 20 to seal pressurized fluid in cylinder 21. The inner wall of guide heating cylinder 22 connecting chamber $R_3$ of push cylinder 2 with the bore of heating cylinder 6 has a configuration such that the cross sectional area of the flow passage gradually decreases towards the bore of heating cylinder 6.

Guide heating cylinder 22 is thermally isolated from push cylinder 2 and heating cylinder 6 at its upper and lower ends by heat insulating plates 24 interposed therebetween so that guide heating cylinder 22 can function as an independent heating region. For this purpose guide heating cylinder 22 is surrounded by a jacket 23 for controlling the temperature in a substantially identical manner as in the case of jackets $8_1 - 8_4$ or $8_5$; and in general, jacket 23 is maintained at a temperature sufficient to decrease the viscosity of the raw material so that it can easily flow into the grooves of screw 7 and yet not so low as to solidify it before it is injected, while jackets $8_1 - 8_3$ are maintained at a temperature lower than that of jacket 23 and jackets $8_4, 8_5$ are maintained at a temperature as high as possible so far as circumstances permit. However, when it is required to further assist the fluidity of the raw material supplied to screw 7, the temperatures of jackets $8_1, 8_2, 8_3$ can be regulated so that they are the same as that of jacket 23. Such temperature control can be easily carried out when the respective jackets are provided with their own medium inlet and exit openings. A chamber $R_5$ is a material supplying chamber formed at the entrance to the bore of heating cylinder 6 by removing material from the inner wall of heating cylinder 6 on the side toward which the screw 7 is rotating as it passes through the bottom of cylinder 22 so that the raw material is conveyed into the bore of heating cylinder 6 by the rotational force of screw 7. The lower tapered end of cylinder 22 opens over the upper portion of screw 7 into chamber $R_5$, so that material from cylinder 22 is fed into the cylinder 6 tangent to and in the direction of rotation of the screw 7.

Having thus described the elements comprising a preferred embodiment of an apparatus according to the present invention, its operation will now be fully described.

When pressurized fluid is supplied to lower chamber $R_2$ of fluid pressure cylinder 3 through conduit 4 - 2, fluid pressure piston 4 is urged toward upper chamber $R_1$ thereby discharging fluid therein via conduit 4 - 1.

At the end of the stroke of piston 4, push piston 1 in vertical push cylinder 2 also reaches the end of its stroke and chamber $R_3$ in cylinder 2 is opened to supplying orifice $R_4$. In this state, the raw material is charged into chamber $R_3$ through orifice $R_4$, whereby the volume of charged material substantially corresponds to the volume of a hopper of a conventional extruder.

Then pressurized fluid is supplied to upper chamber $R_1$ of fluid pressure cylinder 3 via conduit 4 - 1 to lower push piston 1 so that pressure is applied to the raw material to force it down towards chamber $R_5$. Thus, when the material is forced to flow through guide heating cylinder 22, it is subjected to internal heating due to shearing and external heating from jacket 23 to raise its temperature.

The viscosity of the material is regulated by the adjustment of the degree of the temperature rise by controlling the descending velocity of push piston 1 and the temperature of jacket 23. Subsequently, when screw 7 of heating cylinder 6 is rotated through screw shaft 16, piston 17 and driving shaft 19 by prime mover 18, the premix gradually fills the grooves of rotating screw 7 during its rotation to be forcedly advanced in the bore of cylinder 6 until it reaches check valve means 10, 11, 12 whereby the polyester premix pushes valve seat 10 forwardly so that there is a gap between its rear end face and valve body 11 to allow the polyester premix to flow past it and forwardly in a straight line, and it is accumulated in the space formed between screw head 12 and the bore of cylinder 6 as well as in the bore of nozzle 9.

Upon the accumulation of a predetermined volume, of the premix injection piston 17 of injection cylinder 21 is operated by the introduction of pressurized fluid into cylinder 21, so that screw 7 is advanced forwardly to inject the premix through nozzle 9. The temperature of the premix is regulated by jacket $8_5$ and yet the reflux of the premix is prevented by valve body 11 which comes closely into contact with valve seat 11 which is forced rearwardly. Thus the premix filling the cavity 14 of dies 13 by the injection is cured by the heat of heating wires 15 to finish the molding.

As an example of the injection molding according to the present invention, a car heater casing for an automobile (weight = 1,050 g, maximum thickness = 10 mm) was injection molded using a polyester premix containing 20 percent by weight of glass fibers of 6 mm length as the raw material under the following conditions:

temperature at the forward end of the cylinder . . . . . 35°C
    temperature at the intermediate portion of the cylinder . . . . . 25°C
    temperature of the heating cylinder . . . . . 35°C
    rotational speed of the screw . . . . . 39 r.p.m.
    injection pressure . . . . . 520 kg/cm$^2$
    injection rate . . . . . 210 g/sec.
    temperature of the metal dies . . . . . 138°C
    curring time . . . . . 30 sec.
    total molding cycle time . . . . . 39 sec.

The article thus injection molded had an impact strength of 13–18 kg. cm/cm$^3$.

By comparison, a similar article manufactured by a conventional transfer molding process required 160 sec. for the total molding cycle time and had an impact strength of 8 – 14 kg. cm/cm$^3$.

As will be apparent from the above example, the injection molding process according to the present invention has following advantages over the conventional processes such as pressure forming, transfer molding etc.:

1. The molding time for an identical article can be reduced to approximately 25 percent compared with the conventional processes;
2. The damage of glass fibers is greatly reduced so that articles having higher mechanical strength can be obtainable;
3. The articles processed have a glossy surfaces and no glass fiber coming to the surface;
4. The loss due to formation of flash does not occur; and
5. Articles having an excellent dimensional accuracy are obtainable.

While a preferred embodiment of the present invention has been described and illustrated herein it will be understood that modifications may be made without departing from the spirit of the present invention. It should be understood that the appended claims cover all modifications falling within the true spirit and scope of the present invention.

What is claimed is:

1. A process for injection molding thermosetting polyester premixes, comprising the steps of forcing under pressure raw material which is a thermosetting polyester premix in putty-like lumps containing glass fiber-like reinforcement material into the upstream end of a screw-containing heating cylinder through a converging feed path extending radially toward the screw and then tangential to and in the direction of rotation of the screw for a distance less than the circumference of the screw while raising the temperature of the raw material by externally heating the material in the converging path sufficiently so that the externally supplied heat and the heat due to the advancement and shearing action raise the temperature of the raw material to a temperature at which it is plastic and yet is below the thermosetting temperature of the raw material, advancing the thus fed material by the rotation of said screw in said heating cylinder from the upstream end to the downstream end while controlling the temperature thereof by externally heating said cylinder sufficiently so that the externally supplied heat and the heat due to the action of the screw on the raw material keep the temperature of the raw material at a temperature at which it is plastic and still below the thermosetting temperature of the raw material, further advancing the material in the cylinder downstream of the check valve means, and injecting the material into a die heated to the thermosetting temperature of the raw material while checking reflux of the material from the die while at the same time heating the downstream end portion of said heating clyinder downstream of said check valve means to maintain the temperature of the raw material at least said last mentioned temperature and below the thermosetting temperature of said raw material.

* * * * *